United States Patent
Mehta et al.

(10) Patent No.: US 7,576,882 B2
(45) Date of Patent: Aug. 18, 2009

(54) SYSTEM AND METHOD FOR REDIRECTING FACSIMILES THROUGH AN INFORMATION HANDLING SYSTEM NETWORK

(75) Inventors: Pratik M. Mehta, Austin, TX (US); John Medica, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 592 days.

(21) Appl. No.: 11/315,086

(22) Filed: Dec. 22, 2005

(65) Prior Publication Data

US 2007/0146804 A1   Jun. 28, 2007

(51) Int. Cl.
*G06F 3/12* (2006.01)
*H04N 1/32* (2006.01)
*H04M 11/00* (2006.01)
*H04L 12/66* (2006.01)
*H04L 12/28* (2006.01)

(52) U.S. Cl. .............. 358/1.15; 358/400; 358/403; 358/440; 358/442; 358/468; 379/90.01; 379/100.14; 370/352; 370/353; 370/356; 370/401; 370/466

(58) Field of Classification Search ............... 358/1.15, 358/440, 400, 403, 434, 442, 468, 1.13; 379/100.012, 379/100.14, 90.01; 370/353, 356, 466, 352, 370/401, 419, 420, 389; 725/87, 91, 93, 725/95, 100, 101, 103, 104
See application file for complete search history.

(56) References Cited

U.S. PATENT DOCUMENTS

| | | | | |
|---|---|---|---|---|
| 5,287,202 A | * | 2/1994 | Kumarappan | 358/440 |
| 5,764,866 A | * | 6/1998 | Maniwa | 358/1.15 |
| 6,760,324 B1 | | 7/2004 | Scott et al. | 370/352 |
| 6,801,613 B1 | | 10/2004 | Hamilton | 379/207.02 |
| 6,829,348 B1 | | 12/2004 | Schroeder et al. | 379/265.09 |
| 7,089,577 B1 | * | 8/2006 | Rakib et al. | 725/87 |
| 7,092,386 B2 | * | 8/2006 | Wynn | 370/352 |
| 2004/0022236 A1 | * | 2/2004 | Blanco et al. | 370/353 |
| 2005/0231746 A1 | * | 10/2005 | Parry et al. | 358/1.13 |

* cited by examiner

*Primary Examiner*—Edward L Coles
*Assistant Examiner*—Charlotte M Baker
(74) *Attorney, Agent, or Firm*—Hamilton & Terrile, LLP; Robert W. Holland

(57) ABSTRACT

Facsimile documents are communicated between a facsimile machine and a telephone network through an information handling system local area network to provide improved flexibility with the usage and positioning of the facsimile machine with minimal impact on the usage model. A facsimile module associated with the local area network and located distal the facsimile machine converts digital documents provided from the facsimile machine through the local area network into formats for transmission on the telephone network, such as an analog modem signal, TDM packets representing an analog modem signal or VoIP/FoIP packets representing an analog modem signal.

18 Claims, 2 Drawing Sheets

SYSTEM AND METHOD FOR REDIRECTING FACSIMILES THROUGH AN INFORMATION HANDLING SYSTEM NETWORK

BACKGROUND OF THE INVENTION

1. Field of the Invention

The present invention relates in general to the field of information handling system network communication, and more particularly to a system and method for redirecting facsimiles through an information handling system network.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One common function performed by information handling systems is the management, storage and communication of documents. For instance, business organizations often set up networks centered around server information handling systems that allow employees to store and access documents from throughout the business. These networks include local area networks (LANs) supported by both wired and wireless access within a business location and wide area networks (WANs) that interface LANs to each other, such as through dedicated communication links or the Internet. Home networks have also become increasingly common as individual users and families continue to rely on information handling systems to track personal finance and busy schedules. Information handling systems having direct access to a server through a network can retrieve documents from the server and store documents on the server so that any other information handling systems interfaced with the server can retrieve the documents. In addition, various applications, such as e-mail systems, allow information handling systems to communicate documents outside of a network, such as in word processing, PDF, TIF or other formats. Communication of documents via e-mail typically results in transmission of flawless and identical copies of the document since the document communicates as digital information. However, communication by e-mail does present some difficulties that can make it unreliable. For instance, the sender of the document has no guarantee of a confirmation that the document is received by the intended recipient and e-mail systems sometimes fail with little warning, such as during network outages or if overwhelmed by large numbers of messages like spam.

Although information handling system networks provide many convenient, simple and secure ways to communicate documents, businesses and homes have continued to rely on facsimile machines for transmitting many documents. Facsimile machines scan a document to create a digital image, such as in a TIF format, and communicate the image by dialing a telephone call to another facsimile machine over the "POTS" telephone network using an analog modem. Sending and receiving facsimiles has become a common business and home practice with most businesses publishing a facsimile phone number and relying on confirmations returned from a receiving machine as proof of communication of the document. Essentially, a facsimile machine is a specialized information handling system having a scanner to produce an image of a document, memory to store the document, a processor to coordinate communication of the document, an analog modem to send and receive documents, and a printer to print documents. In order to leverage the use of these various components, some "all-in-one" facsimile machines support separate scanning and printing functions. Such systems often include a network connection that interfaces the facsimile machine with a network server information handling system. Typically, the facsimile machine will communicate scanned documents or documents received as facsimiles to the server and will receive documents from the server to print. In some systems, received facsimiles stored to the server are electronically forwarded to the intended recipient, such as an e-mail having the facsimile attached.

Generally, in order to support facsimile machines, businesses and homes have to maintain a dedicated analog phone jack to connect to the facsimile machine modem. Legacy facsimile machines typically do not integrate well with information handling system network-based phone systems, such as Voice over Internet Protocol (VoIP) systems. The analog modem of a facsimile machine does not reliably transmit directly over such networks because of errors introduced during digital sampling by the network of the analog modem signal. This increases the expense of maintaining a facsimile machine due to the cost of installing and maintaining a dedicated phone line with related monthly or billed phone service. In addition, the facsimile machine typically has to be located near the phone jack, which sometimes is an inconvenience. Attempts by business and home users to move away from reliance on legacy facsimile machines towards network solutions for communicating documents have been stymied at least in part by the comfort of users with the legacy facsimile usage model and the perceived increased difficulty of network solutions.

SUMMARY OF THE INVENTION

Therefore a need has arisen for a system and method which redirects facsimile transmissions through an information handling system network.

In accordance with the present invention, a system and method are provided which substantially reduce the disadvantages and problems associated with previous methods and systems for communicating facsimile transmissions. Facsimile machine documents are transmitted at least in part through an information handling system local area network to provide improved flexibility in the use and placement of the facsimile machine.

More specifically, a facsimile machine scans a physical document into a digital file and communicates the digital file through a local area network along with a destination phone number to a facsimile module located distal the facsimile machine, such as on an information handling system server interfaced with the local area network. For instance, the facsimile machine interfaces with the local area network through an Ethernet interface or a wireless interface like 802.11 interfaces. The facsimile module converts the scanned digital document into a format for transmission on a telephone network, such as the PSTN or a VoIP network. For example, the facsimile module creates an analog modem signal for transmission on an analog phone line, TDM packets representing an analog modem signal for transmission on a PBX phone line or VoIP packets representing an analog modem signal for transmission on an Internet phone line. The facsimile module performs a similar conversion for incoming facsimiles to create a digital document that is communicated through the local area network for printing at the facsimile machine.

The present invention provides a number of important technical advantages. One example of an important technical advantage is that the legacy facsimile usage model is preserved for communicating facsimiles through an information handling system network. Users thus interact with a network-based facsimile machine in the same manner as a legacy facsimile machine connected to a telephone network. Using an information handling system network to transmit facsimiles reduces end user expense by avoiding the maintenance of dedicated facsimile telephone lines and improves flexibility by allowing the placement of facsimile machines wherever network interfaces are supported, such as wireless LAN communication. However, the conventional facsimile usage model of inputting a telephone number and initiating a send of a document remains unchanged through the automated communication of the document through the local area network.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Interfacing a facsimile machine with a telephone network through an information handling system local area network provides greater flexibility in the placement and use of the facsimile machine with minimal impact on the facsimile machine usage model. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
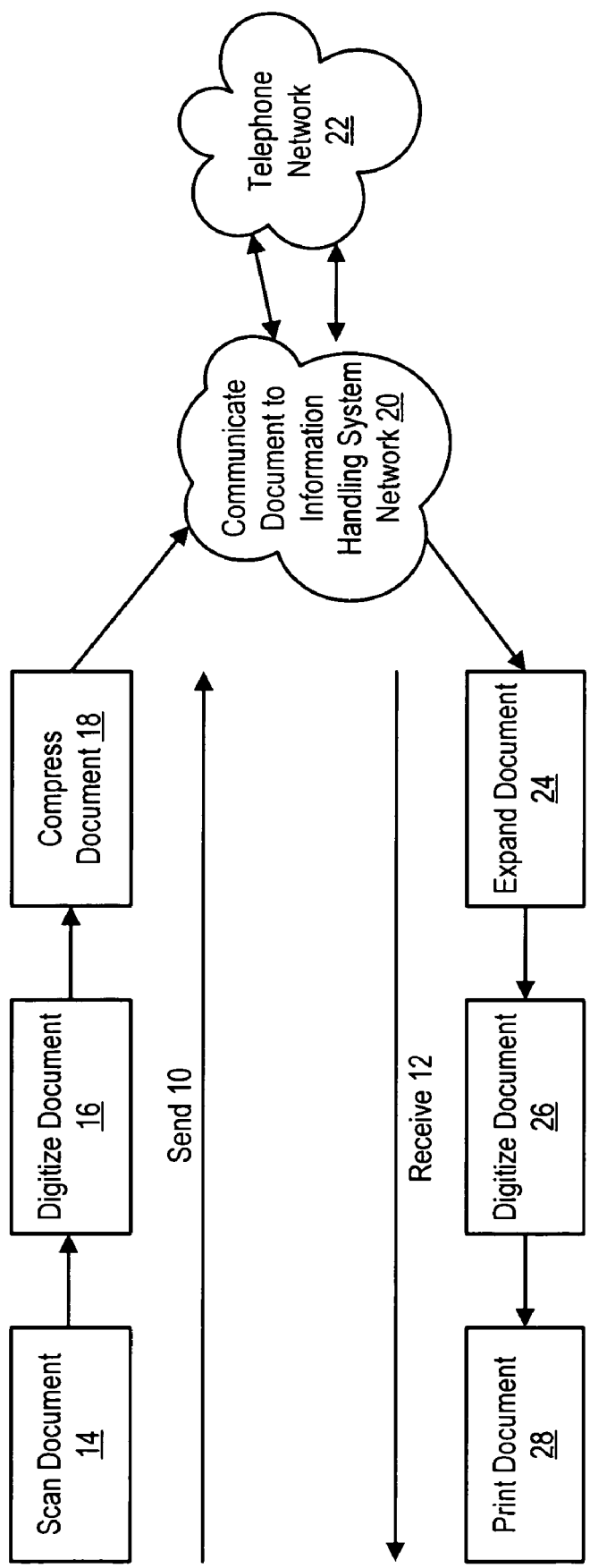
FIG. 1 depicts a block diagram of facsimile document communication flow through an information handling system local area network to a telephone network.

Referring now to FIG. 1, a block diagram depicts a facsimile document communication flow through an information handling system local area network to a telephone network. The facsimile process provides a send path 10 to create and send an electronic copy of a document from a physical copy and a receive path 12 to receive an electronic copy of a document and print the electronic copy as a physical copy. The process begins with scanning of the physical document at step 14, digitizing of the document at step 16 and compressing of the digitized document at step 18 into a standardized digital document file, such as with a TIF format. Steps 14, 16 and 18 mirror steps taken by a facsimile machine to send a facsimile, however, conventional facsimile machines apply digital to analog filtering to the compressed document, such as with an analog modem, and send the document to a telephone number as an analog modem signal. In contrast, the process depicted by FIG. 1 continues to step 20 at which the compressed document is communicated to an information handling system local area network as digital information without conversion to an analog modem signal. The communication of the document to the local area network is supported through a variety of available local area network interfaces, such as Ethernet or wireless interfaces like 802.11 interfaces. The document and the phone number to which the document is to be sent are automatically forwarded to a local area network address distributed from the facsimile machine for conversion to a format appropriate for sending to a telephone network 22.

The receive path 12 for receiving facsimile documents begins with the receipt of a facsimile document from the telephone network at step 22. For instance, an analog modem signal is directed to a phone number associated with an interface to the information handling system local area network at step 20. The facsimile document is converted from the analog modem signal format to a digital format, such as a TIF file, at a location of the local area network distributed from the facsimile machine and then communicated to the facsimile machine through the local area network. At step 24 the document is expanded, at step 26 the document is digitized and at step 28 the document is printed as a conventional facsimile document. From a user's perspective, the process of sending and receiving a facsimile document has a usage model that is the same as sending and receiving a conventional facsimile document. To send the document, the user inputs the destination telephone number and initiates the scan. Received documents print automatically. However, the use of a local area network to initially transmit the document from the facsimile machine provides increased convenience for the management of facsimile machines by providing increased flexibility in the placement of the machine and improved monitoring of facsimile transmissions by information handling systems within the local area network. Indeed, facsimile machines may be located anywhere within the range of a wireless network without regard to the location of an analog telephone line and may optionally not even include an analog modem.

Figure 2:
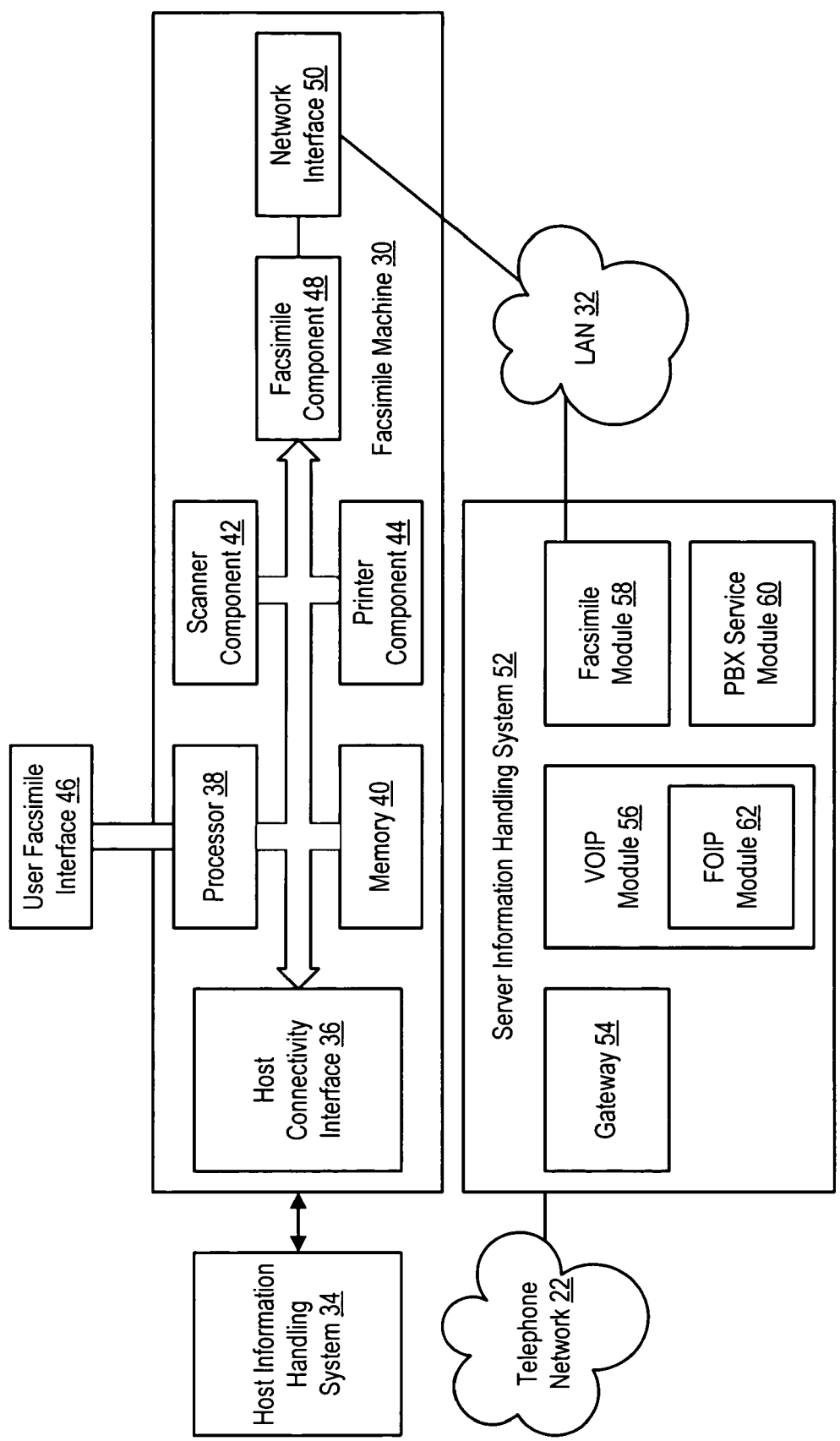
FIG. 2 depicts a block diagram of a facsimile machine configured to transmit facsimile documents through a local area network.

Referring now to FIG. 2, a block diagram depicts a facsimile machine 30 configured to transmit facsimile documents through a local area network 32. Facsimile machine 30 may be configured as only a facsimile machine designed to provide only a facsimile function of sending and receiving facsimile documents. Alternatively, facsimile machine may be configured as an "all-in-one" system that provides independent scanning and printing functions for a host information handling system 34 through a host connectivity interface 36, such as a USB interface. An internal processor 38 and internal memory 40 allow host information handling system 34 to manage functions of a scanner component 42 to scan documents and a printer component 44 to print documents. A user facsimile interface 46 supports operation of scanner component 42 and printer component 44 in combination with a facsimile component 48 to send and receive facsimile documents. For instance, user facsimile interface 46 accepts a telephone number for a facsimile destination and commands from a user to automatically initiate the scanning and sending of the document to the destination telephone number. Upon initiation of sending of a document, scanner component 42 creates a digital file of the document, such as a TIF formatted file, and provides the document to facsimile component 48. Rather than sending the file as a facsimile from the facsimile machine, facsimile component 48 automatically forwards the document through local area network 32 to a server information handling system 52, which supports an interface with telephone network 22 through a gateway 54. For instance, a Voice over Internet Protocol (VoIP) module 56 provides VoIP telephone communication with telephone network 22. A facsimile module 58 transmits the digital document file to the destination telephone number through telephone network 22 by converting the document to an appropriate format as describe below. Received facsimile documents to telephone numbers associated with local area network 32 are compared against available extensions of a PBX service module 60 so that digital documents generated by facsimile module 58 are forwarded to the desired network address for the appropriate facsimile machine 30.

The operation of facsimile module 58 depends upon the type of telephone network 22 that is interfaced with server information handling system 52. In one embodiment, facsimile module 58 is an analog modem that converts the digital file to an analog modem signal, essentially distributing the facsimile modem communication to a point distal facsimile machine 30 by leveraging local area network 32. The server information handling system may alternatively be configured without an analog modem with the conversion to analog optionally occurring in the telephone network itself. In another embodiment, facsimile module 58 converts the digital file directly into a format representing an analog modem signal of the digital document. For instance, if telephone network 22 is the Public Switched Telephone Network (PSTN) then facsimile module 58 determines the digital information that would be generated at the PSTN in Time Division Multiplexing (TDM) packets and sends that digital information to the PSTN telephone network 22. Thus, with a PBX type of connection, facsimile module 58 automatically performs the digital to analog conversion of the analog modem signal so that the receiving facsimile machine will receive the appropriate analog signal. Facsimile functions may be distributed between facsimile component 48 and facsimile module 58 to allow collaboration for more architectural and cost efficient sending and receiving of documents. If telephone network 22 is a VoIP network, such as the Internet, then facsimile module 58 determines the digital information that would be generated in TCP/IP packets and sends the packets to the VoIP network, such as through a Facsimile over Internet Protocol (FoIP) module 62 associated with VoIP module 56. Advantageously, the use of the distributed facsimile module avoids the double digital to analog sampling of an analog modem signal that typically degrades attempts to send analog modem signals through VoIP networks. Similarly, conversion at facsimile module 58 of received analog signals directly from TDM or VoIP packets into to digital documents avoids multiple digital to analog sampling errors that degrade the quality of received facsimile documents.

Although the present invention has been described in detail, it should be understood that various changes, substitutions and alterations can be made hereto without departing from the spirit and scope of the invention as defined by the appended claims.

What is claimed is:

1. A facsimile machine comprising:
   a scanner component operable to scan a physical document into a digital file;
   a printer component operable to print a digital file into a physical document;
   a facsimile component operable to receive a scanned digital file from the scanner component and to receive a telephone number associated with the scanned digital file, the facsimile component further operable to send a digital file to the printer component for printing;
   a local area network interface in communication with the facsimile component and a local area network, the local area network interface operable to communicate digital files from the facsimile component to a local area network and to communicate digital files from the local area network to the facsimile component; and
   a facsimile module associated with the local area network and interfaced with a telephone network, the facsimile module operable to receive the scanned digital file and associated telephone number from the facsimile component through the local area network and to send the scanned digital file to the associated telephone number through the telephone network, the facsimile module further operable to receive digital files as facsimiles from the telephone network and to forward the received digital files to the facsimile component through the local area network.

2. The facsimile machine of claim 1 wherein the network interface comprises Ethernet.

3. The facsimile machine of claim 1 wherein the network interface comprises a wireless interface.

4. The facsimile machine of claim 3 wherein the wireless interface comprises an 802.11 interface.

5. The facsimile machine of claim 1 wherein the telephone network comprises the PSTN and the facsimile module comprises an analog modem.

6. The facsimile machine of claim 1 wherein the telephone network comprises a VoIP network and the facsimile module comprises instructions operable to convert the digital document directly into VoIP packets representing an analog modem signal of the digital document.

7. The facsimile machine of claim 1 wherein the scanned document comprises a TIFF document.

8. A method for communicating facsimile transmissions, the method comprising:
   entering a destination phone number at a facsimile machine;
   scanning a document at the facsimile machine;
   initiating transmission of the document from the facsimile machine to the phone number;
   directing the transmission of the document from the facsimile machine through a local area network to a distributed facsimile module; and
   sending the document from the distributed facsimile module to the phone number through a telephone network.

9. The method of claim 8 farther comprising:
   receiving a document through the telephone network at the distributed facsimile module;

directing the transmission of the document from the facsimile module through the local area network to the facsimile machine; and printing the document at the facsimile machine.

10. The method of claim 8 wherein the local area network comprises an Ethernet interface.

11. The method of claim 8 wherein the local area network comprises a wireless network.

12. The method of claim 11 wherein the wireless network comprises an 802.11 network.

13. The method of claim 8 wherein sending the document further comprises interfacing an analog modem with the PSTN to communicate the document.

14. The method of claim 8 wherein sending the document further comprises:

converting the document directly into VoIP packets representing an analog modem signal of the document; and communicating the VoIP packets to the telephone number through a VoIP network.

15. A method for sending a facsimile, the method comprising:

sending a phone number and digital document from a facsimile machine through a local area network to a facsimile module;

formatting the digital document at the facsimile module for transmission across a telephone network to the phone number; and communicating the formatted digital document from the facsimile module to the phone number.

16. The method of claim 15 wherein formatting the digital document further comprises generating an analog modem signal with an analog modem.

17. The method of claim 15 wherein formatting the digital document further comprises generating a digital representation of an analog modem signal of the digital document in TDM packets for communication to the PSTN.

18. The method of claim 15 wherein formatting the digital document further comprises generating a digital representation of an analog modem signal of the digital document in VoIP packets for communication to the Internet.

* * * * *

UNITED STATES PATENT AND TRADEMARK OFFICE
CERTIFICATE OF CORRECTION

PATENT NO. : 7,576,882 B2 Page 1 of 1
APPLICATION NO. : 11/315086
DATED : August 18, 2009
INVENTOR(S) : Mehta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this

Seventh Day of September, 2010

David J. Kappos
*Director of the United States Patent and Trademark Office*